United States Patent [19]

Arai et al.

[11] Patent Number: 5,416,904
[45] Date of Patent: May 16, 1995

[54] DATA PROCESSING APPARATUS

[75] Inventors: Tsunekazu Arai, Tama; Kazuhiro Matsubayashi, Yokohama, both of Japan

[73] Assignee: Canon Kabushiki Kaisha, Tokyo, Japan

[21] Appl. No.: 298,140

[22] Filed: Aug. 30, 1994

Related U.S. Application Data

[63] Continuation of Ser. No. 996,514, Dec. 15, 1992, abandoned, which is a continuation of Ser. No. 476,943, Feb. 8, 1990, abandoned.

[30] Foreign Application Priority Data

Feb. 15, 1989 [JP] Japan ................................. 1-33803

[51] Int. Cl.6 .............................................. G06F 15/20
[52] U.S. Cl. ...................................................... 395/155
[58] Field of Search ............... 395/155, 161, 419.14, 395/419.17, 145, 148; 345/141, 118, 181

[56] References Cited

U.S. PATENT DOCUMENTS

| | | | |
|---|---|---|---|
| 4,933,865 | 6/1990 | Yamamoto et al. | 364/518 |
| 4,965,744 | 10/1990 | Wagatsuma et al. | 364/518 |
| 4,980,840 | 12/1990 | Yin et al. | 364/518 |

FOREIGN PATENT DOCUMENTS 0254561 1/1988 European Pat. Off. .

Primary Examiner—Phu K. Nguyen
Attorney, Agent, or Firm—Fitzpatrick, Cella, Harper & Scinto

[57] ABSTRACT

A data processing apparatus includes a display for displaying character data, a designation device for designating a desired area on a display screen of the display, an area discriminator for discriminating the area on the display screen of the display designated by the designation device, an adjuster for, when the area designated by the designation device is discriminated to be a character data area, adjusting character data in the character data area, and a controller for causing the display to display the character data adjusted by the adjuster.

56 Claims, 7 Drawing Sheets

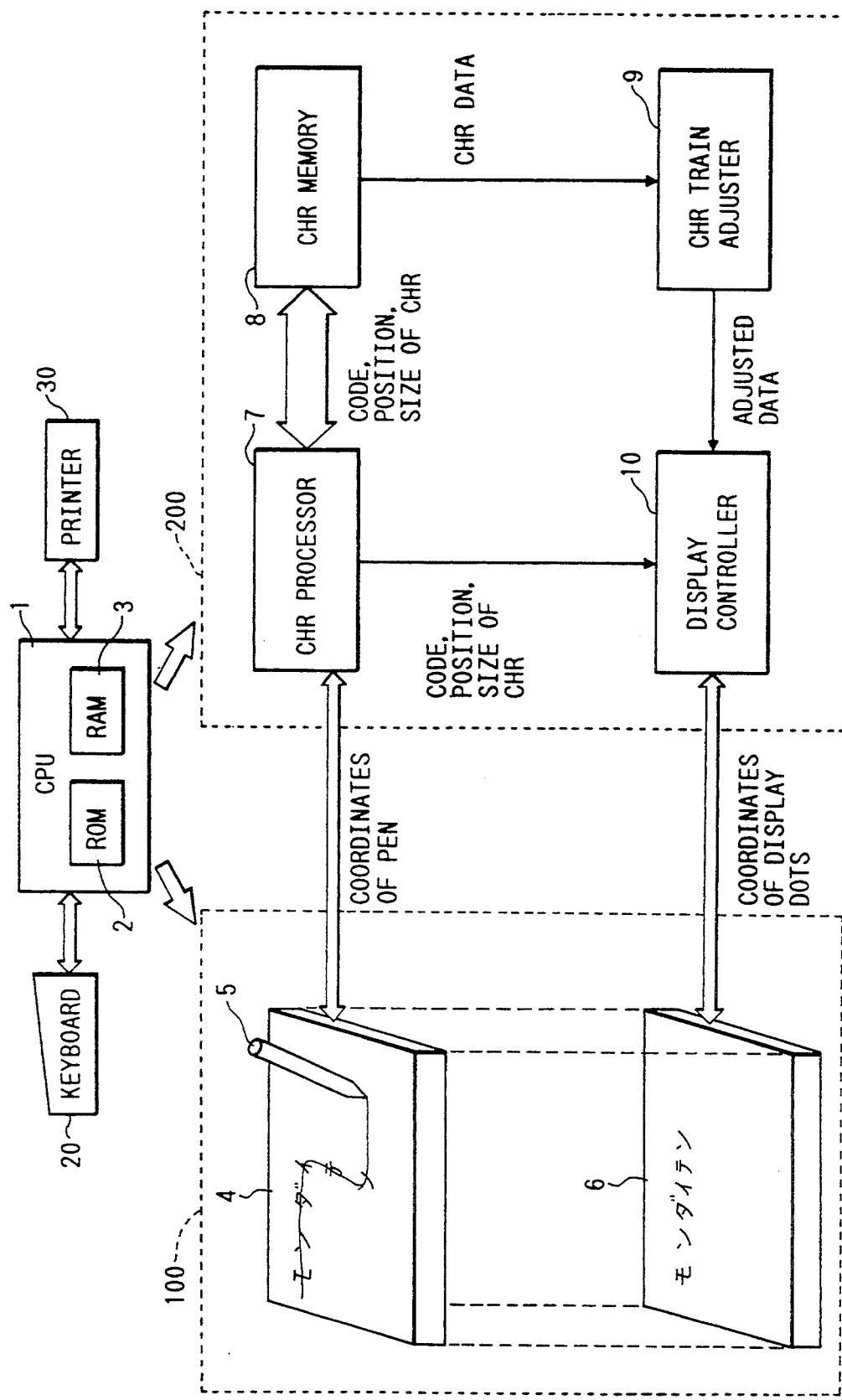

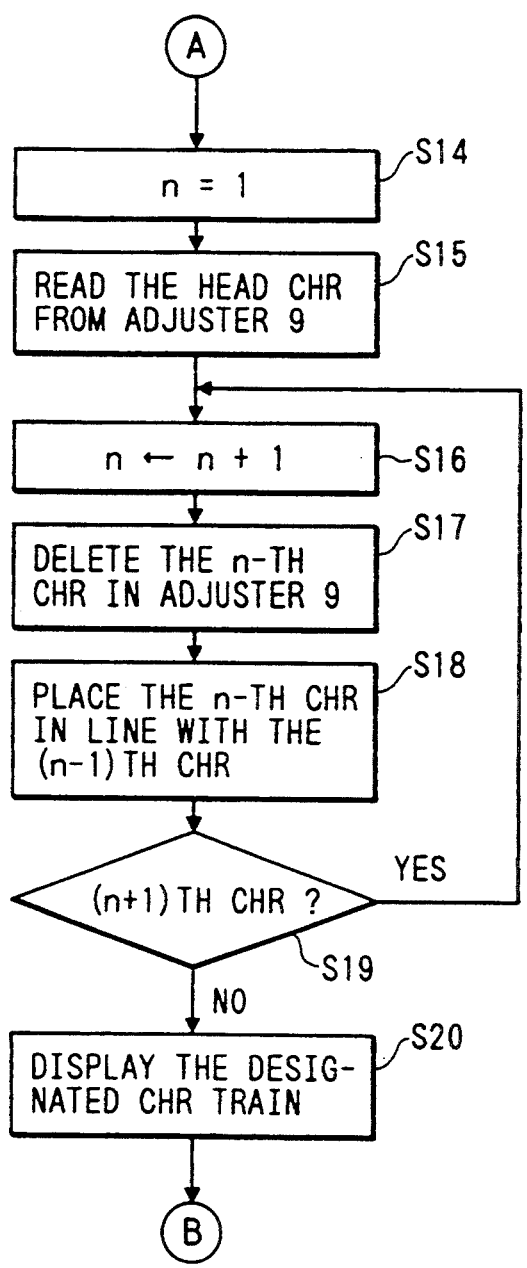

DATA PROCESSING APPARATUS

This application is a continuation of application Ser. No. 07/996,514 filed Dec. 15, 1992, now abandoned, which is a continuation of application Ser. No. 07/476,943, filed Feb. 8, 1990, abandoned.

BACKGROUND OF THE INVENTION

Field of the Invention

The present invention relates to an input/output integrated type data processing apparatus for detecting, e.g., a coordinate position to process data.

Related Background Art

As an apparatus of this type, a word processor which includes a CRT display for displaying input sentences, cursor moving keys for moving a cursor to a position of the displayed sentence data to be edited, edit keys such as a conversion key for converting a character train selected by the cursor into a kanji character, and the like is known.

However, in this conventional apparatus, when a character train on a display screen is selected to be converted to a kanji character, a target character train is selected while moving the cursor by the cursor moving keys, and when a kanji conversion key is depressed, the selected character train is converted to a kanji character. In this manner, the character train is selected based on the order of displayed characters (mainly in the horizontal direction) regardless of the moving direction of the cursor. Therefore, the following drawbacks are posed.

(1) When a character train "とらんかい" which reads "ten-ran-kai" and means "exhibition", and is input over two lines on a display screen, as shown in FIG. 7A, is to be kana-kanji converted, sets of two characters " と ん ", " ら ん ", and " か い " must be separately selected and kana-kanji converted to obtain " 展 ", " 覧 ", and " 会 ", as shown in FIG. 7B, resulting in cumbersome operations.

(2) A drawback in kana-kanji conversion on one page will be exemplified. It is easy to mix both vertically and horizontally written character trains using the cursor moving keys. In the input character trains, a horizontally written character train can be kana-kanji converted, However, a vertically written character train cannot be kana-kanji converted since a vertical character train cannot be selected by the cursor.

SUMMARY OF THE INVENTION

It is an object of the present invention to provide a data processing apparatus which can simultaneously execute character conversion, arrangement, outputting, and the like by designating an alignment direction of an input character train.

It is another object of the present invention to provide a data processing apparatus in which a character train displayed on a display device is linearly traced using a designation pen to convert the traced characters into another type of characters and to display the converted characters or to adjust and display the traced characters.

It is still another object of the present invention to provide a data processing apparatus which can execute character conversion, adjustment, outputting, and the like regardless of an alignment direction of input characters.

It is still another object of the present invention to provide a data processing apparatus which discriminates an externally designated area on a display screen of a display device, and converts character data in an area which is discriminated to be a character area into another type of character data or adjusts the character data.

BRIEF DESCRIPTION OF THE DRAWINGS

FIG. 1 is a block diagram showing an arrangement of a data processing apparatus according to an embodiment of the present invention;

FIGS. 2A and 2B are flow charts for explaining an operation of character train adjustment processing of a CPU 1;

DETAILED DESCRIPTION OF THE EMBODIMENT

A preferred embodiment of the present invention will be described hereinafter with reference to the accompanying drawings.

A data processing apparatus of this embodiment comprises a character input mode as a standard wordprocessor function, and a character train adjustment mode as a characteristic feature of this embodiment. In the character train adjustment mode, a character train can be designated regardless of an alignment direction of the character train on a display screen.

FIG. 1 is a block diagram showing an arrangement of the data processing apparatus of this embodiment. The apparatus includes a CPU 1 for controlling the operation of the entire apparatus in accordance with a program stored in a ROM 2, a keyboard 20 comprising keys for inputting characters or designating various operations, and a printer 30 for printing characters upon an instruction from the keyboard 20. At the keyboard 20, a print instruction of a character train adjusted in the character train adjustment mode is issued by a key input in addition to selection of the character input mode and the adjustment mode.

Figure 2A:
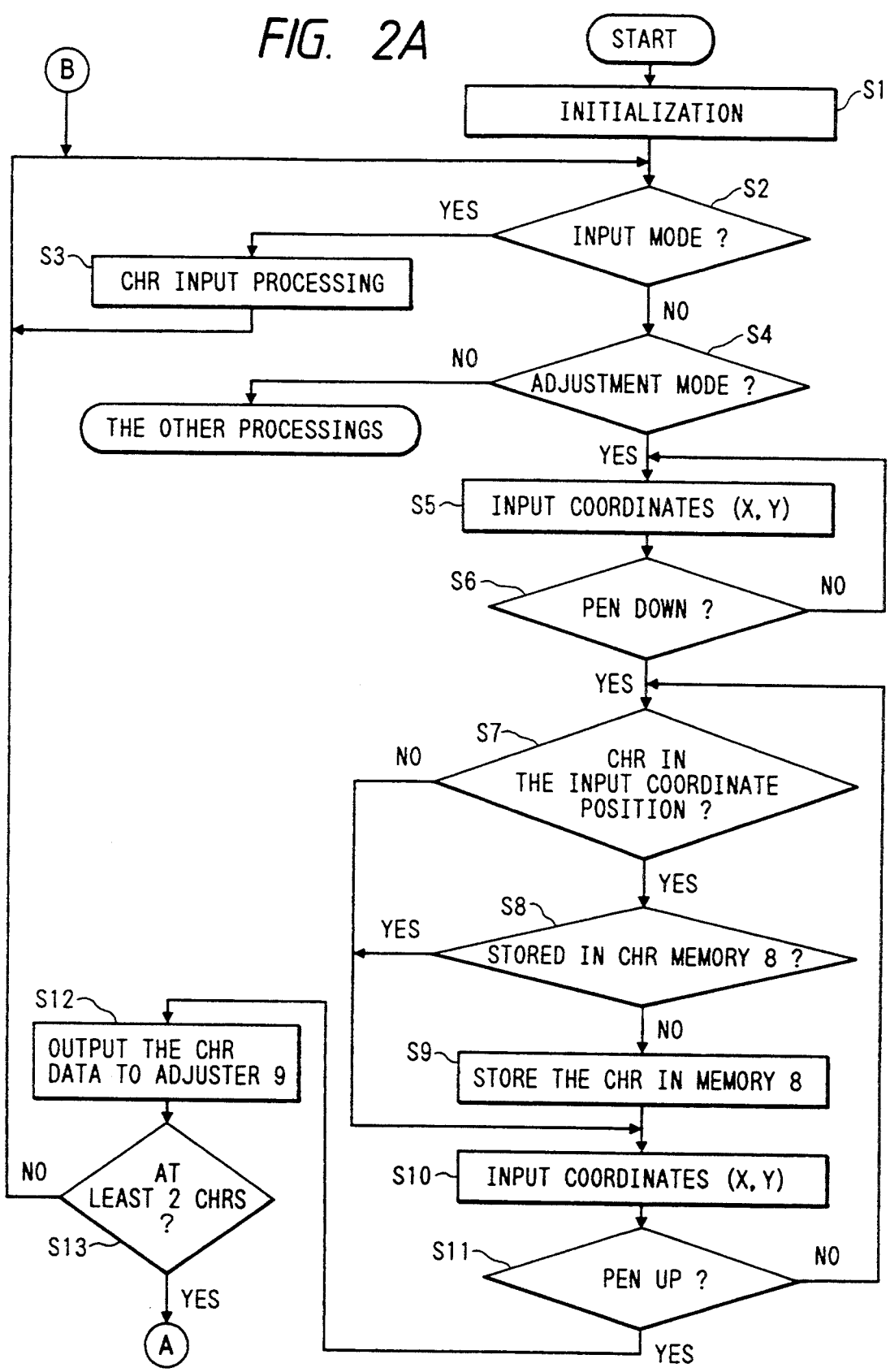

The ROM 2 stores a control program, an error processing program, programs for operating the CPU 1 in accordance with the flow charts of FIGS. 2A and 2B, and the like. A RAM 3 is used as work areas of the various programs in the ROM 2, a temporary save area in error processing, and a buffer for storing character data (including codes, coordinate positions, and sizes of characters) input at the keyboard 20 or control commands.

The main part of the apparatus of this embodiment is roughly classified into an input/output (I/O) block 100 for performing a character input or a display output, and a processing block 200 for executing display/printing processing in the normal character input mode or in the character train adjustment mode. The I/O block 100 includes a coordinate input unit 4 which is constituted by forming vertical and horizontal transparent electrodes and detects a coordinate position, and an input pen 5 for designating a coordinate position on the coordinate input unit 4. When the input pen 5 is pressed onto the coordinate input unit 4, coordinate data of the corresponding coordinate position is input to the CPU 1. Assume that minimum coordinates of the coordinate input unit 4 are (0,0), and maximum coordinates are (320,128). The I/O block 100 also includes a liquid crystal display unit 6 comprising a liquid crystal display and a video RAM. For example, a character train " モンダイ " which reads "mondai" and means "problem" is displayed on the liquid crystal display unit 6 through the transparent coordinate input unit 4 to be horizontally aligned, and a character train " テン " which reads "ten" and means "point" is displayed to be vertically aligned from the character " イ ", as shown in FIG. 1. In this embodiment, when the character train "モンダイテン" is traced by the input pen 5, as shown in FIG. 1, the character train displayed on the liquid crystal display unit 6 is display-converted to horizontally aligned " モンダイテン " (problem point). Thus, the horizontally aligned character train " モンダイテン " can be confirmed above the transparent coordinate input unit 4. This processing will be described later. In the processing block 200, a character processor 7 supplies character data (including codes, coordinate positions, and sizes of characters) to a display controller 10 (to be described later) upon an instruction from the keyboard 20 in the character input mode to cause the liquid crystal display unit 6 to display characters, and acquires character data designated by the input pen 5 and supplied from the coordinate input unit 4 from the RAM 3 in the character train adjustment mode. A character memory 8 receives and stores designated character data from the character processor 7. The character memory 8 sends character data upon completion of an input operation of designated characters. The areas of the character memory 8 may be allocated in the RAM 3. A character train adjuster 9 updates coordinate data of characters to adjust characters following the start character in the horizontal direction when a character train including two or more continuous characters is input from the character memory 8. The display controller 10 generates display dot coordinate data on the basis of character data supplied from the character train adjuster 9, and sends the coordinate data to the liquid crystal display unit 6.

Methods of storing input character data and designated character data of this embodiment will be described hereinafter.

The method of storing input character data will first be described below.

Figure 3:
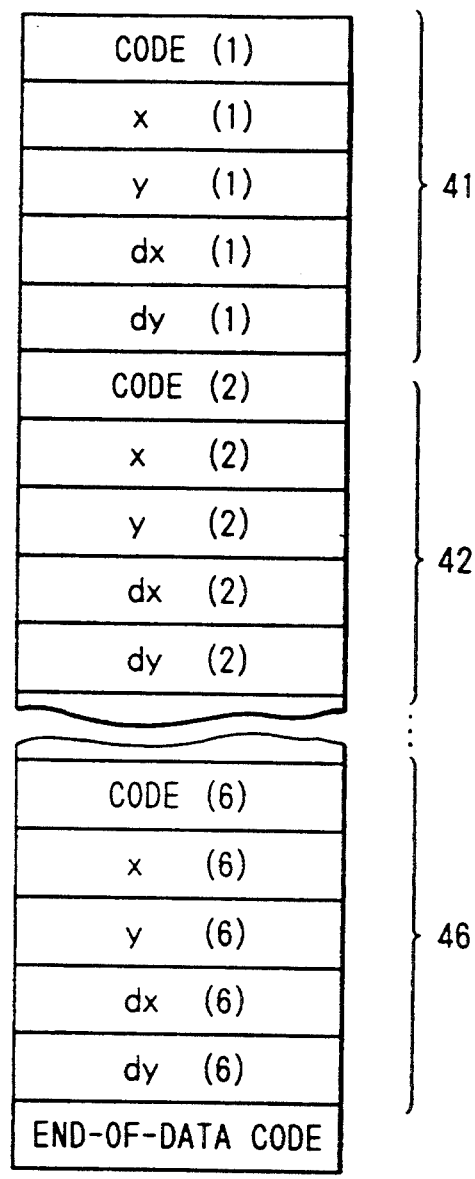
FIG. 3 is a view for explaining a method of storing input character data.
Figure 4:
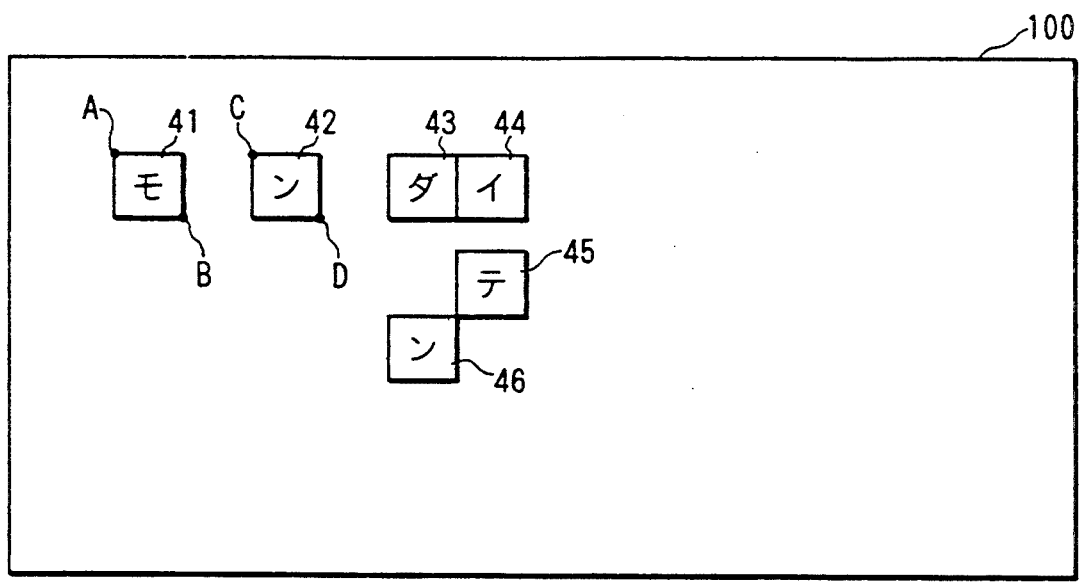
FIG. 4 is a view showing a character train displayed based on input character data.

FIG. 3 is a view for explaining the method of storing input character data, and FIG. 4 is a view showing a character train on the basis of input character data. In FIGS. 3 and 4, reference numeral 41 designates an area of the first character (start character) " モ ", and 42 designates an area of the second character " ン ". Reference numerals 43 to 46 respectively designate randomly located characters " ダ ", " イ ", " テ ", and " ン " to follow the character 42. For the first character " モ ", input character data is stored to have a character code code(1), X- and Y-coordinates x(1) and y(1) of a point A indicating the start point of the area 41, and X- and Y-coordinates x(1)+dx(1) and y(1)+dy(1) of a point B indicating the end point of the area 41. Note that as the X- and Y-coordinates of the point B, only data dx(1) and dy(1) are stored. For the second character " ン ", input character data is stored to have a character code code(2), X- and Y-coordinates x(2) and y(2) of a point C indicating the start point of the area 42, and X- and Y-coordinates x(2)+dx(2) and y(2)+dy(2) of a point D indicating the end point of the area 42. Similarly, input character data of characters " ダ ", " イ ", " テ ", and " ン " are stored in the RAM 3. The code code(n) ($1 \leq n \leq 6$) is expressed by a general 2-byte code (JIS). As shown in FIG. 3, an end-of-data code (e.g., FFFF in hexadecimal notation) is always located at the end of the input character data. In this manner, the codes, coordinate positions, and sizes of the input characters are stored.

The method of storing designated character data will be described below.

Figure 5:
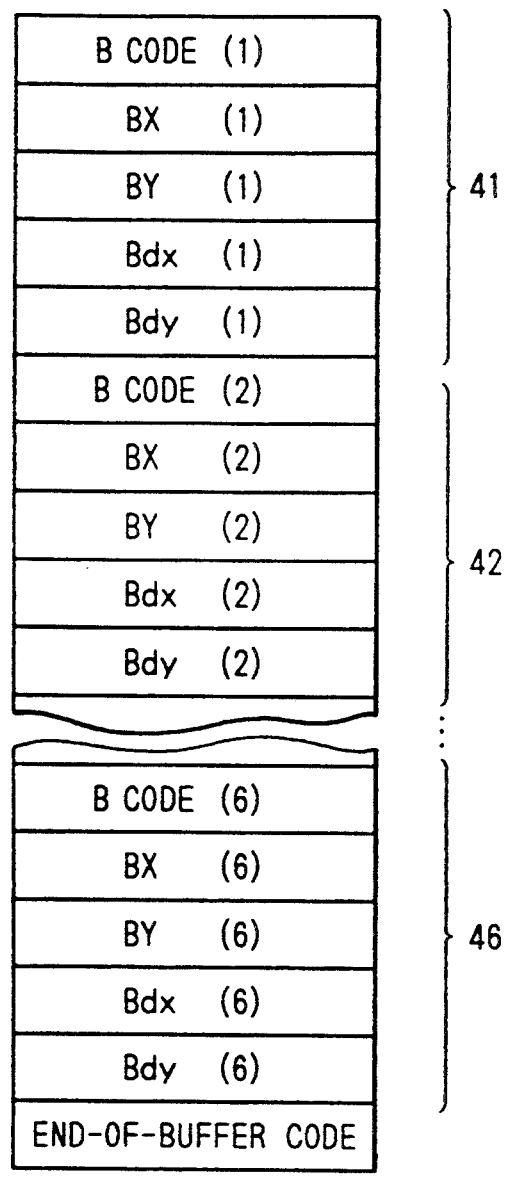
FIG. 5 is a view for explaining a method of storing designated character data.
Figure 6:
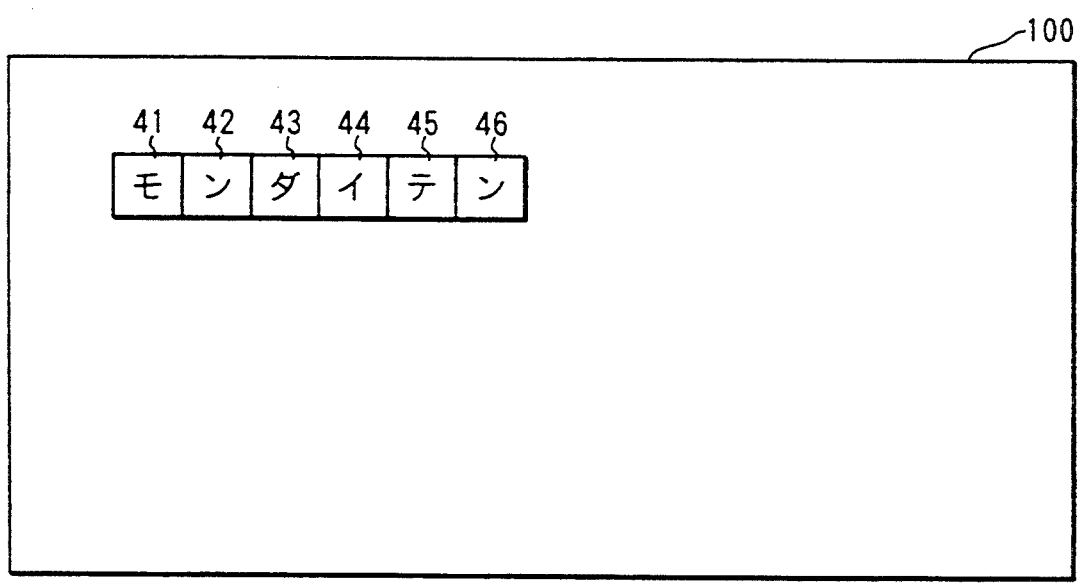
FIG. 6 is a view showing a character train displayed based on designated character data.
Figure 7A:
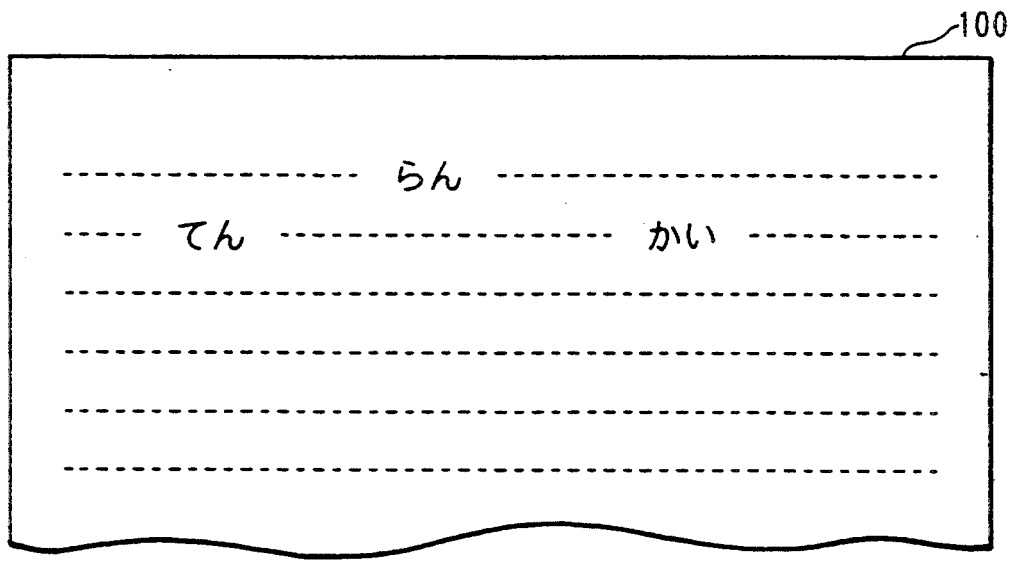
FIGS. 7A and 7B are views for explaining conventional kana-kanji conversion.
Figure 7B:
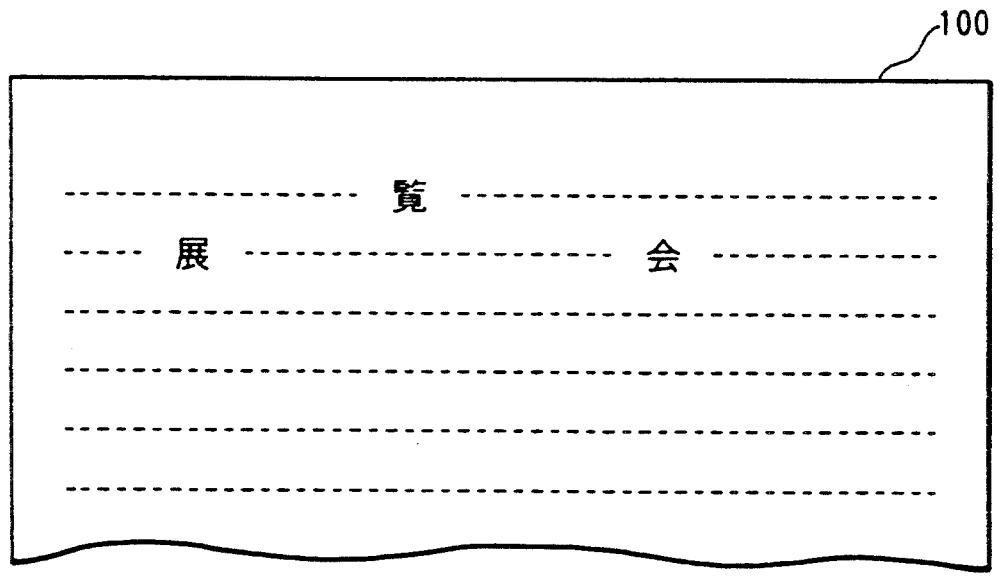

FIG. 5 is a view for explaining the method of storing designated character data, and FIG. 6 shows a character train displayed based on the designated character data.

When the character " モ " in the area 41 is designated first, data code(1), x(1), y(1), dx(1), and dy(1) of the character " モ " are loaded from the RAM 3. These data are added with an initial letter "B" and stored as data Bcode(1), BX(1), BY(1), Bdx(1), and Bdy(1) for a designated character in the character memory 8. Therefore, when " モ ", " ン ", " ダ ", " イ ", " テ ", and " ン " are designated in this order, input character data of the character " ン " of the area 42 are stored as designated character data Bcode(2), BX(2), BY(2), Bdx(2), and Bdy(2) in turn. Similarly, character data up to the character " ン " of the area 46 are stored. After the last data Bdy(6) of the sequentially stored designated character data, an end-of-buffer code (e.g., FFFF in hexadecimal notation) indicating the end of the designated character data is always stored. After the designated character data are stored in this manner, adjustment of a designated character train as the characteristic feature of this embodiment is performed, and a character train " モンダイテン " is displayed to be horizontally aligned, as shown in FIG. 6.

A method of adjusting a character train of this embodiment will be described in detail below.

FIGS. 2A and 2B are flow charts for explaining an operation of character train adjustment processing of the CPU 1.

Various parameters are initialized, and an instruction of a character input mode or a character train adjustment mode is waited. If the character input mode is instructed at the keyboard 20, input character data are stored in the RAM 3 according to character inputs in step S3 (steps S1 to S3). If the character train adjustment mode is instructed at the keyboard, and if a character area is present at a coordinate position detected by the coordinate input unit 4 during a pen-down operation and the designated character is not stored in the character memory 8, the designated character is stored in the character memory 8 (steps S7 to S11). Upon discrimination of the character area, when conditions of $X(n) <$ input coordinate $X < X(n)+dx(n)$ and $Y(n) <$ input coordinate $Y < Y(n)+dy(n)$ are satisfied, the character area is determined. Thereafter, if a pen-up operation is detected, the designated character data stored in the character memory 8 are supplied to the character train adjuster 9 (step S12), and the adjuster 9 checks if the input character data constitute a character train of two or more characters (step S13). Note that a pen-up code is expressed by FFFF, FFFF in hexadecimal notation. If a character train includes only one character, the processing in step S2 and thereafter is repeated. If a character train includes two or more characters, a character train adjustment counter n ($n \geq 1$) indicating the order of designated characters is set to be "1" (step S14), and indicated character data of the start character are read out from the character train adjuster 9. The value BX(1)

is given to a variable MX, the value BY(1) is given to a variable MY, and the value Bdx(1) is given to a variable Mdx (step S15). The adjustment counter n is incremented by "1" (step S16) to erase a display of an nth character in the character train adjuster 9 (step S17).

nth designated character data are updated so that the position of the nth designated character is aligned besides an (n−1)th designated character, and hence, the display start position of the next (n+1)th character is determined. In this case, MX+Md is given to MX, this MX is given to BX(n), MY is given to BY(n), and Bdx(n) is given to Mdx (step S18). Therefore, when n=2, the content of the second designated character data includes the character code Bcode(2), BX(2)=BX(1)+Bdx(1), BY(1)=BY(1), and Mdx=Bdx(2). In this manner, the designated character data are repetitively adjusted until no (n+1)th designated character is present (steps S16 to S19). After the character train is adjusted, the designated character train is displayed (step S20).

The character train adjustment mode of adjusting a character train has been described. Normal kanji conversion may, however, be executed according to this character train adjustment mode. In this case, when the character train adjustment mode is switched to a kana-kanji conversion mode, a kana character train which is freely designated in the vertical and horizontal directions can be converted to kanji characters at the same time. For example, when the areas 41, 42, 43, 44, 45, and 46 of the characters shown in FIG. 4 are sequentially designated by the input pen 5 according to processing in the character train adjustment mode, the designated characters are stored in the order of " $\doteq$ ", " $\succ$ ", " $\dot{q}$ ", " $\land$ ", " $\mp$ ", and " $\succ$ ", and the character train need only be sent to a kana-kanji conversion mode such as a conventional Japanese wordprocessor to easily obtain an output " 冈 圤 产 ". If the output of the character train adjustment mode or the kana-kanji convention mode is set to be the printer 30, the adjusted character train in the same manner as that output to the liquid crystal display unit 6 can be easily printed at the same time.

As described above, according to this embodiment, characters on a display screen, e.g., a character train displayed over a plurality of lines, a vertically written character train, a character train in which vertically written characters and horizontally written characters are mixed, and the like can be easily simultaneously adjusted, converted, printed, and so on as a character train in which characters are aligned in a designated order.

In the above embodiment, input character data and adjusted designated character data are separately stored when characters are adjusted. After adjustment or the like, input character data corresponding to adjustment processing may be written as designated character data. This arrangement is effective when a plurality of character trains to be designated are present.

In the above embodiment, characters are adjusted mainly in the horizontal direction of a screen. However, the present invention is not limited to this. For example, if the alignment direction is determined to be the vertical direction of a screen, a horizontally aligned character train may be adjusted in the vertical direction. In this case, processing for adjusting characters to the right in the horizontal direction from the first character in the character train adjustment mode may be modified so that characters are aligned downward from the first character. The same applies to kanji conversion.

As described above, according to the present invention, characters on a display screen, e.g., a character train displayed over a plurality of lines, a vertically written character train, a character train in which vertically written characters and horizontally written characters are mixed, and the like can be easily simultaneously adjusted, converted, printed, and so on as a character train in which characters are aligned in a designated order.

What is claimed is:

1. A data processing apparatus comprising:
   display means for displaying image data;
   designation means for designating, in a desired sequential order, a plurality of desired areas on a display screen of said display means by a trace of an input of coordinate input means;
   area discrimination means for discriminating the areas on the display screen of said display means designated by said designation means; and
   control means for causing said display means to adjust, in the desired sequential order, a display position of the image data in the discriminated area by moving the image data from a position at which the image data was displayed at the time of the designation.

2. An apparatus according to claim 1, further comprising conversion means for converting the character data adjusted by said adjustment means into another type of character data.

3. An apparatus according to claim 1, wherein said designation means comprises transparent coordinate input means arranged immediately on the display screen of said display means.

4. An apparatus according to claim 1, wherein said display means comprises a liquid crystal display device.

5. An apparatus according to claim 1, wherein said designation means includes input means for inputting character data by hand writing.

6. An apparatus according to claim 1, wherein said designation means includes adjustment direction designation means for designating an adjustment direction of the character data in the designated character data area.

7. A data processing apparatus comprising:
   display means for displaying character data;
   designation means for designating, in a desired sequential order, a plurality of desired positions on a display screen of said display means by a trace of an input of a coordinate input apparatus;
   discrimination means for discriminating whether or not the position designated by said designation means corresponds to a display area of the character data;
   storage means for, when said discrimination means discriminates that the designated position corresponds to the display area of the character data, storing the character data of the display area together with order information indicating the desired sequential order; and
   output means for outputting the character data stored in said storage means in an order corresponding to the order information by moving the character data from a position at which the character data was displayed at the time of the designation.

8. An apparatus according to claim 7, further comprising conversion means for converting the character data adjusted by said adjustment means into another type of character data.

9. An apparatus according to claim 7, wherein said designation means comprises transparent coordinate input means arranged immediately on the display screen of said display means.

10. An apparatus according to claim 7, wherein said display means comprises a liquid crystal display device.

11. An apparatus according to claim 7, wherein said designation means includes input means for inputting character data by hand writing.

12. A data processing apparatus according to claims 1 or 7, wherein the character data adjustment is executed in a sequential order of the trace of the input of the coordinate input apparatus by the designation means.

13. A data processing apparatus according to claim 7, wherein the discriminated character data train adjustment is executed in a sequential order of the trace of the input by the designation pen.

14. A data processing apparatus comprising:
   display means for displaying character data;
   designation means for designating, in a desired sequential order, a plurality of desired positions on a display screen of said display means by a trace of an input of a coordinate means;
   discrimination means for discriminating a plurality of characters existing in the positions designated by said designation means; and
   control means for causing said display means to adjust, in the desired sequential order, a display position of the discriminated characters by moving the characters from a position at which the character data was displayed at the time of designation.

15. An apparatus according to claim 14, further comprising conversion means for converting the character data train adjusted by said adjustment means into another type of character data train.

16. An apparatus according to claim 14 wherein said designation means comprises transparent coordinate input means arranged immediately on the display screen of said display means.

17. An apparatus according to claim 14, wherein said display means comprises a liquid crystal display device.

18. An apparatus according to claim 14, wherein said designation means includes input means for inputting character data by hand writing.

19. A data processing apparatus comprising:
   display means for displaying character data;
   designation means for designating, in a desired sequential order, a plurality of desired characters on a display screen of said display means by a trace of an input of a coordinate means; and
   control means for causing said display means to adjust display positions of the designated characters in the desired sequential order by moving the characters from a position at which the characters were displayed at the time of the designation and to display the adjusted characters.

20. An apparatus according to claim 19, further comprising conversion means for converting the character data train adjusted by said adjustment means into another type of character data train.

21. An apparatus according to claim 19, wherein said designation means comprises transparent coordinate input means arranged immediately on the display screen of said display means.

22. An apparatus according to claim 19, wherein said display means comprises a liquid crystal display device.

23. An apparatus according to claim 19, wherein said designation means includes input means for inputting character data by hand writing.

24. A data processing apparatus comprising:
   display means for displaying character data;
   a tablet which is arranged immediately on a display screen of said display means and through which the character data displayed on the display screen are visible;
   a designation pen for designating, in a desired sequential order, a plurality of desired positions by touching a surface of said tablet;
   discrimination means for discriminating a plurality of characters designated by a trace of said designation pen; and
   control means for causing said display means to adjust., in the desired sequential order, a display position of the discriminated characters by moving the characters from positions at which the characters were displayed at the time of the designation.

25. An apparatus according to claim 24, further comprising conversion means for converting the character data train adjusted by said adjustment means into another type of character data train.

26. An apparatus according to claim 24, wherein said display means comprises a liquid crystal display device.

27. An apparatus according to claim 24, wherein said adjustment means adjusts the designated character train in a designated order.

28. A data processing apparatus according to claims 14 or 19, wherein the discriminated character data train adjustment is executed in a sequential order of the trace of the input of the coordinate input apparatus by the designation means.

29. A data processing method comprising the steps of:
   displaying image data on a display;
   designating, in a desired sequential order, a plurality of desired areas on a display screen of said display by a trace of an input of a coordinate input apparatus;
   discriminating the designated areas on the display screen; and
   adjusting, in the desired sequential order, a display position of the image data in the discriminated area by moving the image data from a position at which the image data was displayed at the time of the designation.

30. A method according to claim 29, further comprising the step of converting the adjusted character data into another type of character data.

31. A method according to claim 29, wherein the designating step comprises arranging a transparent coordinate input on the display screen.

32. A method according to claim 29, wherein the display screen comprises a liquid crystal device.

33. A method according to claim 29, wherein the designating step includes inputting character data by hand writing.

34. A method according to claim 29, wherein the designating step includes designating an adjustment direction of the character data in the designated character area.

35. A data processing method comprising the steps of:
   displaying character data;
   designating, in a desired sequential order, a plurality of desired positions on a display screen by a trace of an input of a coordinate input apparatus;

discriminating whether or not the position designated in said designating step corresponds to a display area of the character data;

storing, when the discrimination discriminates that the designated position corresponds to the display area of the character data, the character data of the display area together with order information indicating the desired sequential order; and outputting the stored character data in an order corresponding to the order information by moving the character data from a position at which the character data was displayed at the time of the designation.

36. A method according to claim 35, further comprising converting the adjusted character data into another type of character data.

37. A method according to claim 35, wherein the designating step comprises arranging a transparent coordinate input device on the display screen.

38. A method according to claim 35, wherein the display screen comprises a liquid crystal display device.

39. A method according to claim 35, wherein the designating step includes inputting character data by hand writing.

40. A method according to claims 29 or 35, wherein the character data adjustment is executed in a sequential order of the trace of the input of the coordinate input apparatus in the designation step.

41. A data processing method comprising the steps of:
displaying character data;

designating, in a desired sequential order, a plurality of desired positions on a display screen by a trace of an input of a coordinate device;

discriminating a plurality of characters existing in the positions designated in said designating step; and adjusting, in the desired sequential order, a display position of the discriminated characters by moving the characters from a position at which the character data was displayed at the time of designating.

42. A method according to claim 41, further comprising the step of converting the adjusted character data train into another type of character data train.

43. A method according to claim 41, wherein the designating step comprises arranging a transparent coordinate input immediately on the display screen.

44. A method according to claim 41, wherein the display screen comprises a liquid crystal display device.

45. A method according to claim 41, wherein the designating step includes inputting character data by hand writing.

46. A data processing method comprising the steps of:
displaying character data;

designating, in a desired sequential order, a plurality of desired characters on a display screen by a trace of an input of a coordinate device; and adjusting display positions of the designated characters in the desired sequential order by moving the characters from a position at which the characters were displayed at the time of the designation and to display the adjusted characters.

47. A method according to claim 46, further comprising the step of converting the adjusted character data train into another type of character data train.

48. A method according to claim 46, wherein the designating step comprises arranging a transparent coordinate input device immediately on the display screen.

49. A method according to claim 46, wherein the display screen comprises a liquid crystal display device.

50. A method according to claim 46, wherein the designating step includes inputting character data by hand writing.

51. A method according to claims 41 or 46, wherein the discriminated character train adjustment is executed in a sequential order of the trace of the input of the coordinate device.

52. A data processing method comprising the steps of:
displaying character data on a display screen;

arranging a tablet immediately on a display screen of said display means through which the character data displayed on the display screen are visible;

designating, in a desired sequential order, a plurality of desired positions by touching a surface of said tablet with a designation pen;

discriminating a plurality of characters designated by a trace of said designation pen; and adjusting, in the desired sequential order, a display position of the discriminated characters by moving the characters from positions at which the characters were displayed at the time of the designation.

53. A method according to claim 52, further comprising the step of converting the adjusted character data train into another type of character data train.

54. A method according to claim 52, wherein the display screen comprises a liquid crystal display device.

55. A method according to claim 52, wherein the designated character train is adjusted in a designated order.

56. A method according to claim 52, wherein the discriminated character data train adjustment is executed in a sequential order of the trace of the designation pen.

* * * * *

UNITED STATES PATENT AND TRADEMARK OFFICE
CERTIFICATE OF CORRECTION

PATENT NO. : 5,416,904

DATED : May 16, 1995

INVENTOR : TSUNEKAZU ARAI, ET AL.

It is certified that errors appear in the above-identified patent and that said Letters Patent is hereby corrected as shown below:

COLUMN 1

Line 45, "verted," should read --verted.--.

COLUMN 2

Line 31, "wordproces-" should read --word proces- --.

COLUMN 4

Line 43, "waited." should read --awaited.--.

COLUMN 6

Line 28, "adjustment means" should read --display means--; and

Line 39, "hand writing." should read --handwriting.--.

COLUMN 7

Line 9, "hand writing." should read --handwriting.--;

Line 14, "claim 7," should read --claim 24,--;

Line 35, "adjustment means" should read --display means--;

Line 37, "claim 14" should read --claim 14,--;

Line 45, "hand writing." should read --handwriting.--; and

Line 60, "adjustment means" should read --display means--.

UNITED STATES PATENT AND TRADEMARK OFFICE
CERTIFICATE OF CORRECTION

PATENT NO. : 5,416,904

DATED : May 16, 1995

INVENTOR : TSUNEKAZU ARAI, ET AL.

It is certified that errors appear in the above-identified patent and that said Letters Patent is hereby corrected as shown below:

<u>COLUMN 8</u>

Line 3, "hand writing." should read --handwriting.--;

Line 17, "just.," should read --just,--;

Line 23, "adjustment means" should read --display means--;

Line 28, "adjustment means" should read --display means--; and

Line 59, "hand writing." should read --handwriting.--.

<u>COLUMN 9</u>

Line 24, "hand writing." should read --handwriting.--; and

Line 51, "hand writing." should read --handwriting.--.

UNITED STATES PATENT AND TRADEMARK OFFICE
CERTIFICATE OF CORRECTION

PATENT NO. : 5,416,904

DATED      : May 16, 1995

INVENTOR   : TSUNEKAZU ARAI, ET AL.

It is certified that errors appear in the above-identified patent and that said Letters Patent is hereby corrected as shown below:

<u>COLUMN 10</u>

Line 21, "hand writing." should read --handwriting.--.

Signed and Sealed this

Twenty-first Day of November, 1995

*Attest:*

BRUCE LEHMAN

*Attesting Officer*  *Commissioner of Patents and Trademarks*